United States Patent
Huang et al.

(10) Patent No.: US 10,982,134 B2
(45) Date of Patent: Apr. 20, 2021

(54) POLYMER COMPOSITE CONTAINING QUANTUM DOTS

(71) Applicants: Dow Global Technologies LLC, Midland, MI (US); Rohm and Haas Electronic Materials LLC, Marlborough, MA (US)

(72) Inventors: Jessica Ye Huang, Midland, MI (US); Zhifeng Bai, Midland, MI (US); Liang Chen, Midland, MI (US); Jake Joo, Somerville, MA (US); Ing-Feng Hu, Midland, MI (US); James C. Taylor, Grafton, MA (US)

(73) Assignees: Rohm and Haas Electronic Materials LLC, Marlborough, MA (US); Dow Global Technologies LLC, Midland, MI (US)

(*) Notice: Subject to any disclaimer, the term of this patent is extended or adjusted under 35 U.S.C. 154(b) by 281 days.

(21) Appl. No.: 16/070,300

(22) PCT Filed: Feb. 20, 2017

(86) PCT No.: PCT/US2017/018577
§ 371 (c)(1),
(2) Date: Jul. 16, 2018

(87) PCT Pub. No.: WO2017/151333
PCT Pub. Date: Sep. 8, 2017

(65) Prior Publication Data
US 2019/0062626 A1    Feb. 28, 2019

Related U.S. Application Data

(60) Provisional application No. 62/302,315, filed on Mar. 2, 2016.

(51) Int. Cl.
| | |
|---|---|
| *C09K 11/02* | (2006.01) |
| *C08F 222/10* | (2006.01) |
| *C09D 133/12* | (2006.01) |
| *C09K 11/08* | (2006.01) |
| *C08K 3/013* | (2018.01) |

(52) U.S. Cl.
CPC ........ *C09K 11/02* (2013.01); *C08F 222/1006* (2013.01); *C08K 3/013* (2018.01); *C09D 133/12* (2013.01); *C09K 11/08* (2013.01); *C08F 222/102* (2020.02); *C08F 2800/20* (2013.01)

(58) Field of Classification Search
CPC ..................................................... C09K 11/02
See application file for complete search history.

(56) References Cited

U.S. PATENT DOCUMENTS

| 9,082,941 B2 | 7/2015 | Naasani et al. | |
| 2008/0209876 A1* | 9/2008 | Miller | H01M 10/052 55/522 |
| 2015/0014629 A1* | 1/2015 | Breen | H01L 21/0256 257/14 |
| 2015/0140678 A1 | 5/2015 | Qi | |
| 2016/0005932 A1* | 1/2016 | Lee | C09K 11/70 257/98 |
| 2017/0210903 A1* | 7/2017 | Kawamitsu | H01L 31/028 |

OTHER PUBLICATIONS

Search report for corresponding China Application No. 201780011708.9 dated Dec. 24, 2019.

* cited by examiner

*Primary Examiner* — Matthew E. Hoban
(74) *Attorney, Agent, or Firm* — G. Creston Campbell; Theresa Falcone

(57) ABSTRACT

A polymer composite comprising quantum dots; said polymer composite comprising: (a) quantum dots; (b) polymerized units of a first compound having at least one readily polymerizable vinyl group, a molecular weight from 300 to 20,000 and at least one continuous acyclic hydrocarbyl chain of at least five carbon atoms; and (c) polymerized units of a second compound having at least one readily polymerizable vinyl group and a molecular weight from 100 to 750; wherein a readily polymerizable vinyl group is part of a (meth)acrylate ester group or is attached directly to an aromatic ring, and the molecular weight of the first compound minus the molecular weight of the second compound is at least 100.

6 Claims, No Drawings

POLYMER COMPOSITE CONTAINING QUANTUM DOTS

FIELD OF THE INVENTION

The present invention relates to a polymer composite containing quantum dots.

BACKGROUND OF THE INVENTION

Semiconductor quantum dots (QD) provide optical absorption and emission (photoluminescence PL or electroluminescence EL) behaviors that are significantly different from those of bulk materials. As the particle size decreases, effective energy bandgap (Eg), or available energy levels, increases and creates a blue shifted PL spectrum. This spectrum tunability by the particle size dependent quantum confinement effect within the same material is a critical advantage over conventional bulk semiconductors. Because of their unique optical properties, QD have been of great interest in many display and lighting applications. Most QD have inorganic shells with a larger bandgap material to confine electron and hole pairs within the core region and prevent any surface charge states. The outer shells are then capped by organic ligands to reduce trap states of the shell that can lead to reduced quantum yield (QY). Organic ligands help QD to disperse in organic/aqueous solvents. Typical organic ligands surrounding QD have relatively long alkyl chains which provide high solubility in non-polar solvents or monomers. Unfortunately, QD are very susceptible to photo-oxidation during light absorption/conversion process. Also, moisture can have similar impacts when ligands are not compatible. QD typically are encapsulated in a polymer matrix to protect them from adverse effects of water and oxygen. For example, JP2015217359 discloses siloxane compounds partially modified by (meth)acryloyloxy groups and/or epoxy groups for forming a film containing quantum dots. However, this reference does not disclose the compositions described herein.

SUMMARY OF THE INVENTION

The present invention provides a polymer composite comprising quantum dots; said polymer composite comprising: (a) quantum dots; (b) polymerized units of a first compound comprising at least one readily polymerizable vinyl group, a molecular weight from 300 to 20,000 and at least one continuous acyclic hydrocarbyl chain of at least five carbon atoms; and (c) polymerized units of a second compound comprising at least one readily polymerizable vinyl group and a molecular weight from 100 to 750; wherein a readily polymerizable vinyl group is part of a (meth)acrylate ester group or is attached directly to an aromatic ring, and the molecular weight of the first compound minus the molecular weight of the second compound is at least 100.

DETAILED DESCRIPTION OF THE INVENTION

Percentages are weight percentages (wt %) and temperatures are in ° C., unless specified otherwise. Operations were performed at room temperature (20-25° C.), unless specified otherwise. Boiling points are measured at atmospheric pressure (ca. 101 kPa). The term "(meth)acrylate" means acrylate or methacrylate. Quantum dots are well known in the art, see, e.g., US2012/0113672. Molecular weight is measured in Daltons and is the sum of the atomic weights for a monomeric compound and the weight-average molecular weight (Mw) for mixtures, e.g., oligomeric or polymeric compounds.

Preferably, the first compound has a molecular weight of at least 400, preferably at least 500, preferably at least 600, preferably at least 700, preferably at least 800, preferably at least 1,000; preferably no more than 15,000, preferably no more than 10,000, preferably no more than 8,000, preferably no more than 6,000, preferably no more than 5,000, preferably no more than 3,000, preferably no more than 2,000. Preferably, the second compound has a molecular weight of at least 150, preferably at least 200, preferably at least 250; preferably no more than 650, preferably no more than 500, preferably no more than 400, preferably no more than 350. Preferably, the molecular weight of the first compound minus that of the second compounds is at least 300, preferably at least 500, preferably at least 700, preferably at least 900, preferably at least 1,100; preferably no greater than 19,900, preferably no greater than 15,000, preferably no greater than 10,000, preferably no greater than 5,000. When the composite comprises more than one first compound and/or more than one second compound the preceding limits on the molecular weight difference apply to the most prevalent combinations of a first compound and a second compound whose amounts total at least 50% of the total weight of the composite, preferably at least 75%. When a polymerizable vinyl group is attached to an aromatic ring (e.g., a benzene, naphthalene or pyridine ring), preferably the aromatic ring has from three to twenty carbon atoms, preferably from five to fifteen. Preferably, the aromatic ring contains no heteroatoms and has from six to fifteen carbon atoms, preferably from six to twelve carbon atoms.

Preferably, the first compound has from one to four readily polymerizable vinyl groups, preferably no more than three, preferably no more than two, preferably one. When the first compound is an oligomer the number of vinyl groups is the number average for the distribution. Preferably, the second compound has from one to six readily polymerizable vinyl groups, preferably no more than four, preferably no more than three; preferably at least two. Preferably, the polymerizable vinyl groups in the first compound are (meth)acrylate ester groups ($CH_2$=C(R)C(O)O—, where R is H or $CH_3$; also known as (meth)acryloyloxy). Preferably, the second compound has (meth)acrylate ester groups or the second compound is divinylbenzene The first compound has at least one continuous acyclic hydrocarbyl chain of at least five carbon atoms, i.e., a straight or branched (preferably straight) chain having at least five methylene groups, olefinic carbons or a combination thereof, and no heteroatoms. Preferably, the chain has at least six carbon atoms, preferably at least seven, preferably at least eight; preferably no more than fifteen, preferably no more than fourteen, preferably no more than thirteen. Preferably, the chain contains only methylene groups. Preferably, the second compound is a cyclic compound, i.e. one having at least one aliphatic or aromatic ring, preferably an aliphatic ring. Preferably, the first compound has only carbon, hydrogen, oxygen and nitrogen atoms; preferably only carbon, hydrogen and oxygen. Preferably, the second compound has only carbon, hydrogen, oxygen and nitrogen atoms; preferably only carbon, hydrogen and oxygen. Preferably, the first compound is aliphatic.

Preferably, the polymer composite further comprises polymerized units of a third compound having one (meth)acrylate group and a molecular weight from 100 to 270;

preferably at least 140, preferably at least 160; preferably no greater than 250, preferably no greater than 230. Preferably, the third compound is aliphatic.

Preferably, the polymer composite comprises from 0.5 to 40 wt % polymerized units of the first compound, from 55 to 95 wt % polymerized units of the second compound and 0.1 to 5 wt % quantum dots. Preferably, the polymer composite comprises from 0.5 to 10 wt % polymerized units of the first compound, from 65 to 92 wt % polymerized units of the second compound, from 5 to 20 wt % of the third compound and 0.1 to 5 wt % quantum dots.

Especially preferred first compounds include poly(12-hydroxystearic acid) adduct with glycidyl methacrylate, adducts of glycidyl methacrylate with $C_{12}$-$C_{24}$ aliphatic carboxylic acids, maleate or succinate esters of $C_{12}$-$C_{24}$ aliphatic hydroxycarboxylic acids, adducts of glycidyl methacrylate with $C_{12}$-$C_{24}$ aliphatic diols and polyethylene glycol di-(meth)acrylate esters or bis(glycidyl methacrylate) adducts.

Especially preferred second compounds include tricyclo [5.2.1.0$^{2,6}$] decane dimethanol diacrylate, Bisphenol A dimethacrylate, 2-butyl-2-ethyl-1,3-propanediol dimethacrylate, 1,10-bis(acryloyloxy)decane and Especially preferred third compounds include isobornyl acrylate, 3,5,5-trimethylhexyl acrylate, dodecyl acrylate, decyl acrylate, tridecyl acrylate, isodecyl acrylate, L-menthyl acrylate, tricyclo[5.2.1.0$^{2,6}$]decylmethyl acrylate, 3,3,5-trimethylcyclohexyl methacrylate and 3,3,5-trimethylcyclohexyl methacrylate.

In one preferred embodiment of the invention, the polymer composite is part of a multilayer assembly which also comprises an outer layer on each side of the polymer composite. Preferably, the outer layer is an oxygen barrier which also inhibits passage of moisture. Preferably, the outer layer comprises a polymer composite, preferably one comprising polyethylene terephthalate (PET), polyaryletherketones, polyimides, polyolefins, polycarbonate, polymethyl methacrylate (PMMA), polystyrene, or a combination thereof. Preferably, the outer layer further comprises oxides or nitrides, preferably silicon oxides, titanium dioxide, aluminum oxide, silicon nitrides or a combination thereof. Preferably the oxides or nitrides are coated on the surface of the polymer composite facing the QD layer Preferably, each outer layer comprises a polymer composite having a thickness from 25 to 150 microns (preferably 50 to 100 microns) and an oxide/nitride layer having a thickness from 10 to 100 nm (preferably 30 to 70 nm). In some preferred embodiments of the invention, the outer layer comprises at least two polymer composite layers and/or at least two oxide/nitride layers; different layers may be of differing composition. Preferably, the outer layers have a very low oxygen transmission rate (OTR, <$10^{-1}$ cc/m$^2$/day) and low water vapor transmission rate (WVTR, <$10^{-2}$ g/m$^2$/day) Preferably, the polymer composite in the outer layers has a Tg from 60 to 200° C.; preferably at least 90° C., preferably at least 100° C.

Preferably, the thickness of the polymer composite of this invention is from 20 to 500 microns, preferably at least 50 microns, preferably at least 70 microns, preferably at least 80 microns, preferably at least 90 microns; preferably no greater than 400 microns, preferably no greater than 300 microns, preferably no greater than 250 microns, preferably no greater than 200 microns, preferably no greater than 160 microns. Preferably, the thickness of each outer layer is from 20 to 100 microns, preferably from 25 to 75 microns.

Preferably, the polymer composite of this invention is prepared by free radical polymerization of the resin prepared by mixing monomers, QD and other optional additives. Preferably, the resin is coated on a first outer layer prior to curing by typical methods, e.g., spin coating, slot die coating, gravure, ink jet and spray coating. Preferably, curing is

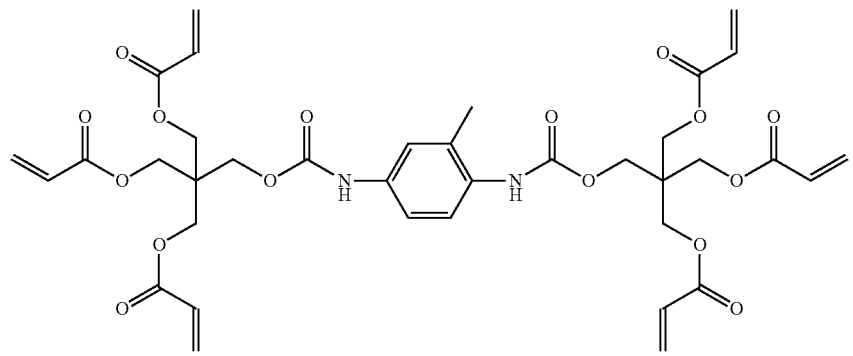

(A)

initiated by exposing the resin to ultraviolet light or heat, preferably ultraviolet light, preferably in the UVA range.

Preferably, the polymer composite of this invention comprises from 0.01 to 5 wt % of quantum dots, preferably at least 0.03 wt %, preferably at least 0.05 wt %; preferably no more than 4 wt %, preferably no more than 3 wt %, preferably no more than 2 wt %. Preferably, quantum dots comprise CdS, CdSe, CdTe, ZnS, ZnSe, ZnTe, HgS, HgSe, HgTe, GaN, GaP, GaAs, InP, InAs or a combination thereof. In a preferred embodiment, the quantum dots are cadmium-free.

Preferably, ligands surrounding the inorganic part of quantum dots have non-polar components. Preferred ligands include, for example, trioctyl phosphine oxide, dodecanethiol and fatty acid salts (e.g., stearate salts, oleic acid salts).

Other additives which may be incorporated into the polymer composite of this invention include uv stabilizers, antioxidants, scattering agents to improve light extraction, and thickeners to increase viscosity (e.g., urethane acrylate oligomers). Preferred thickeners include urethane acrylates, cellulose ethers, cellulose acrylic esters, polystyrene polymers, polystyrene block copolymers, acrylic resin and polyolefin elastomers. Preferably, polystyrene, acrylic and polyolefin thickeners have Mw from 50,000 to 400,000;

preferably from 100,000 to 200,000. Preferably, cellulose ethers have Mw from 1,000 to 100,000.

Urethane acrylate oligomers can be polyester type, polyether type, polybutadiene type, or polycarprolactone type. They can have difunctional, trifunctional, hexafunctional reactivities. Viscosities of oligomers can range from 1000 to 200,000 cPs at 50 C. For non-polar ligand QDs, polybutadiene types are preferred.

Preferably, the first inner layer comprises from 1 to 60 wt % urethane acrylates, preferably at least 5 wt %, preferably at least 10 wt %; preferably no more than 50 wt %, preferably no more than 40 wt %.

Preferred forms for the polymer composite include, e.g., composites, beads, strips, rods, cubes and plates. The polymer composite is useful in many applications, including, e.g., displays, lighting and medical applications. Preferred display applications include public information displays, signage, televisions, monitors, mobile phones, tablets, laptops, automotive dashboards and watches.

EXAMPLES

Abbreviations Used in Examples

PHS is poly(12-hydroxystearic acid), Mw=1,500
GMA is glycidyl methacrylate
IBOA is isobornyl acrylate
SR833 is tricyclo [$5.2.1.0^{2,6}$] decane dimethanol diacrylate
I-819 and I-651 are IRGACURE photoactive polymerization initiators from Ciba-Geigy Corp.

The PHS-GMA synthesis involves coupling GMA to the PHS via a base-catalyzed, nucleophilic addition reaction. The 250 mL round-bottom flask reactor was used. To clarify the PHS solution, 10 g of toluene was added to the reactor with 17.9 g PHS. Under nitrogen protection and reflux setup, the flask was heated to 80° C. and a mixture of the monomer, inhibitor, catalyst, and additional toluene was added to the warm, transparent polymer solution. Table 1 indicates the amounts used. The molar ratio of GMA to —COOH was 1.5, which is sufficient to offset potential epoxide hydrolysis reactions.

The solvent mixture was refluxed for a period of 5 h under a nitrogen atmosphere. The reactor temperature was maintained at 140° C. with the oil bath temperature set to 145~155° C. PHS appeared brown in color and was transparent.

The final product was purified by methanol to remove the catalyst, inhibitor and GMA.

TABLE 1

Ingredients used for the preparation of PHS-GMA.

| reagent | mass (g) |
| --- | --- |
| Reaction Flask | |
| Poly(12-hydroxystearic acid) (PHS) | 17.9 |
| toluene | 10 |
| Separate Beaker[a] | |
| Glycidyl methacrylate (GMA) | 2.6 |
| Butylated hydroxytoluene (BHT) | 0.037 |
| N,N-dimethyldodecylamine (95%) | 0.1 |

[a]Reagents mixed in a separate beaker in order to dissolve the inhibitor.

Example 1

[1] Sample Preparation for Examples

All samples were prepared by lamination of the resin formulations between two i-Component PET barrier films. Approximately 2 mL of resin was dispensed on the bottom film and the top has applied with a gap coating bar with gap setup (10 mil-12 mil) based on desired film thickness. Samples were cured using a FUSION UV SYSTEMS, INC (DRS-10/12 QNH), 500 mJ/cm^2 UV curing intensity.

Formulation Information

1. Blend SR833 and photoinitiator together.
2. Mix PHS-GMA with SR833. Heat it to 50 C for 15 mins.
3. Add IBOA with QD into the mixture.
4. Cure film under UV light

[2] Formulation

| Wt % | PHS-GMA | PHS | Green CFQD QD | IBOA | SR833 | I-819 |
| --- | --- | --- | --- | --- | --- | --- |
| #1 | 10 | 0 | 0.5 | 9.5 | 78.5 | 1.5 |
| #2 | 20 | 0 | 0.5 | 9.5 | 68.5 | 1.5 |
| #3 | 0 | 10 | 0.5 | 9.5 | 78.5 | 1.5 |
| #4 | 0 | 20 | 0.5 | 9.5 | 68.5 | 1.5 |

[3] Morphology Characterization

Transmission electron microscopy (TEM) shows QD has large agglomeration in SR833 rich resin which proves that it has poor compatibility with SR833. With PHS, QD has better dispersion, but they are confined or preferentially trapped into PHS rich phase (the grey region corresponding to PHS rich phase in samples with RuO4 staining). With PHS-GMA, the QD is well dispersed into the crosslinked resin matrix and there is no phase separation between PHS-GMA and SR833.

TEM sample preparation: cured film samples were trimmed to a small trapezoid so that sections could be collected. Sections of approximately 100 nanometers in thickness were collected parallel to flow at ambient temperature using a diamond knife on a Leica EM UC7 microtome and placed on 400 mesh virgin TEM grids for observation. The microtomed films were stained with the vapor phase of a 0.5% aqueous ruthenium tetraoxide solution for 3~5 mins at ambient temperature. TEM Images were collected on a FEI Tecnai 12 operated at 120 kV accelerating voltage using a Gatan MultiScan CCD camera. After staining, the PHS phase can be imaged by TEM. The resin with PHS-GMA shows no sign of phase separation which indicates PHS-GMA reacts with SR833 and forms a crosslinked polymer, while the samples without GMA exhibited a separate PHS phase surrounding the QD's.

[4] $O_2$ Permeability (Cc/Mn/Day/Atm) of Resin Films with 10% Additives (PHS or PHS-GMA)

| $O_2$ permeability (cc/m/day/atm) of film with 10% PHS | $O_2$ permeability (cc/m/day/atm) of film with 10% PHS-GMA |
| --- | --- |
| 0.030 | 0.021 |

$O_2$ permeability of films were measured using mocon ox-tran model 2/21 with 3% $O_2$ and 97% $N_2$ at 23 C.

[5] Film Density Comparison of Resin Films with 10% Additives

| Density (g/cm3) of film with 10% PHS | Density (g/cm3) of film with 10% PHS-GMA |
|---|---|
| 1.2004 | 1.2145 |

Film density was measured using helium pycnometry. Compared with PHS, the same loading of PHS-GMA has higher resin film density and better oxygen barrier property.

Example 2

[1] Sample Preparation for Examples

All samples were prepared by lamination of the resin formulations between two i-Component PET barrier films. Approximately 2 mL of resin was dispensed on the bottom film and the top has applied with a gap coating bar with gap setup (10 mil-12 mil) based on desired film thickness. Samples were cured in a Fusion UV F300S curing system with UVA 800 mJ/cm, unless otherwise noted. Film thicknesses were determined by measurement of the cured films with a micrometer and then subtracting out the barrier film thickness. Photoluminescent Quantum Yield (PLQY), peak emission wavelength (PWL) and full-width half-max of the emission peak (FWHM) were measured with a custom integrating sphere with 450 nm excitation LED or Hamamatsu C9920-02G integrating sphere. In case of BLU spectrum measurement, the cured film was placed between the light guide plate and prism film/brightness enhancement film of blue LED based backlight unit (BLU). BLU spectrum was measured using GL Spectis spectroradiometer.

[2] Formulation

| | A | B | C | D | E | F | G |
|---|---|---|---|---|---|---|---|
| red CFQD QD | 0.21 | 0.21 | 0.21 | 0.21 | 0.21 | 0.21 | 0.21 |
| PHS | 0 | 1 | 3 | 6 | 0 | 0 | 0 |
| PHS-GMA | 0 | 0 | 0 | 0 | 1 | 3 | 6 |
| poly (cyclohexyl methacrylate) | 4 | 4 | 4 | 4 | 4 | 4 | 4 |
| I-819 | 0.75 | 0.75 | 0.75 | 0.75 | 0.75 | 0.75 | 0.75 |
| I-651 | 0.75 | 0.75 | 0.75 | 0.75 | 0.75 | 0.75 | 0.75 |
| Finex 30 S LP2 ZnO | 2.125 | 2.125 | 2.125 | 2.125 | 2.125 | 2.125 | 2.125 |
| 4OH-TEMPO | 0.01 | 0.01 | 0.01 | 0.01 | 0.01 | 0.01 | 0.01 |
| Isobornyl acrylate | 9.79 | 9.79 | 9.79 | 9.79 | 9.79 | 9.79 | 9.79 |
| tricyclo [$5.2.1.0^{2,6}$] decane dimethanol diacrylate | 82.365 | 81.365 | 79.365 | 76.365 | 81.365 | 79.365 | 76.365 |

[3] Quantum Efficiency Measurement

| Film Lot # | Additive | QE | R_PEAK | R_FWHM | B_PEAK | B_FWHM |
|---|---|---|---|---|---|---|
| A | None | 48.5% | 659.0 | 62 | 451.0 | 21 |
| B | 1% PHS | 58.3% | 648.0 | 60 | 451.0 | 21 |
| C | 3% PHS | 61.5% | 648.0 | 60 | 451.0 | 21 |
| D | 6% PHS | 62.2% | 647.0 | 61 | 451.0 | 21 |
| E | 1% PHS-GMA-1 | 59.9% | 649.0 | 59 | 451.0 | 21 |
| F | 3% PHS-GMA-1 | 58.3% | 647.0 | 60 | 451.0 | 21 |
| G | 6% PHS-GMA-1 | 59.3% | 647.0 | 61 | 451.0 | 21 |

QE results showed PHS and PHS-GMA gained higher Quantum efficiency with lower loading level than the control sample. Also, peak position is much closer to original peak position (632 nm under diluted toluene measurement), indicating that QDs are dispersed better when PHS and PHS-GMA is introduced to the formulation.

[4] Reliability Test: Quantum Efficiency Drop of the Resin Film at 336 Hours at 80° C.

| Film Lot # | Additive | RESULTS AT 336 HOURS AT 80 C. QE % |
|---|---|---|
| A | None | 0.921 |
| B | 1% PHS | 0.799 |
| C | 3% PHS | 0.748 |
| D | 6% PHS | 0.599 |
| E | 1% PHS-GMA-1 | 0.793 |
| F | 3% PHS-GMA-1 | 0.801 |
| G | 6% PHS-GMA-1 | 0.725 |

PHS-GMA shows lower QE drop than PHS after 336 hours at 80 C.

The invention claimed is:

1. A polymer composite comprising quantum dots; said polymer composite comprising: (a) quantum dots; (b) polymerized units of a first compound having at least one readily polymerizable vinyl group, a molecular weight from 300 to 20,000 and at least one continuous acyclic hydrocarbyl chain of at least five carbon atoms; and (c) polymerized units of a second compound having at least one readily polymerizable vinyl group and a molecular weight from 100 to 750; wherein the first compound is chosen from poly(12-hydroxystearic acid) adduct with glycidyl methacrylate, adducts of glycidyl methacrylate with $C_{12}$-$C_{24}$ aliphatic carboxylic acids, maleate or succinate esters of $C_{12}$-$C_{24}$ aliphatic hydroxycarboxylic acids, adducts of glycidyl methacrylate with $C_{12}$-$C_{24}$ aliphatic diols and polyethylene glycol di-(meth)acrylate esters or bis(glycidyl methacrylate) adducts; wherein the second compound is chosen from tricyclo [$5.2.1.0^{2,6}$] decane dimethanol diacrylate, Bisphenol A dimethacrylate, 2-butyl-2-ethyl-1,3-propanediol dimethacrylate, 1,10-bis(acryloyloxy)decane and

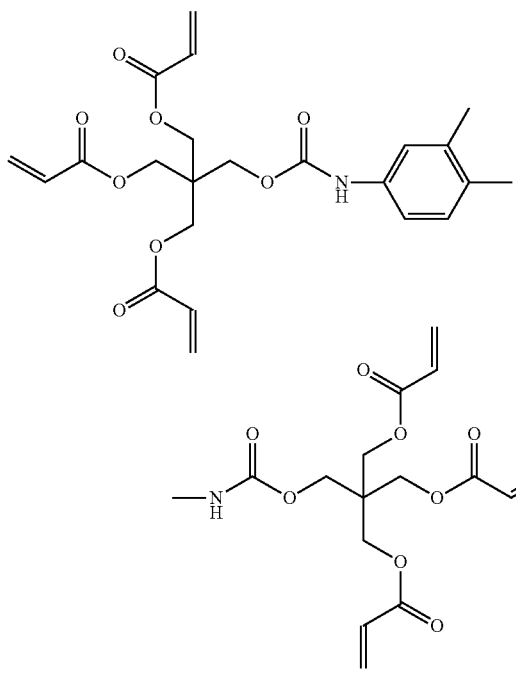

(A)

and wherein the molecular weight of the first compound minus the molecular weight of the second compound is at least 100.

2. The polymer composite of claim 1 in which the first compound has from one to three readily polymerizable vinyl groups and a molecular weight from 500 to 15,000.

3. The polymer composite of claim 2 in which the second compound has from one to six readily polymerizable vinyl groups and a molecular weight from 200 to 750.

4. The polymer composite of claim 3 in which the molecular weight of the first compound minus the molecular weight of the second compound is at least 300.

5. The polymer composite of claim 4 in which the polymer composite further comprises polymerized units of a third compound having one (meth)acrylate group and a molecular weight from 100 to 270.

6. The polymer composite of claim 5 comprising from 0.5 to 10 wt % polymerized units of the first compound, from 65 to 92 wt % polymerized units of the second compound, from 5 to 20 wt % of the third compound and 0.1 to 5 wt % quantum dots.

* * * * *